May 15, 1934. H. C. WOODSMALL 1,958,734
UNIVERSAL GRINDER
Filed Dec. 24, 1932 2 Sheets-Sheet 1
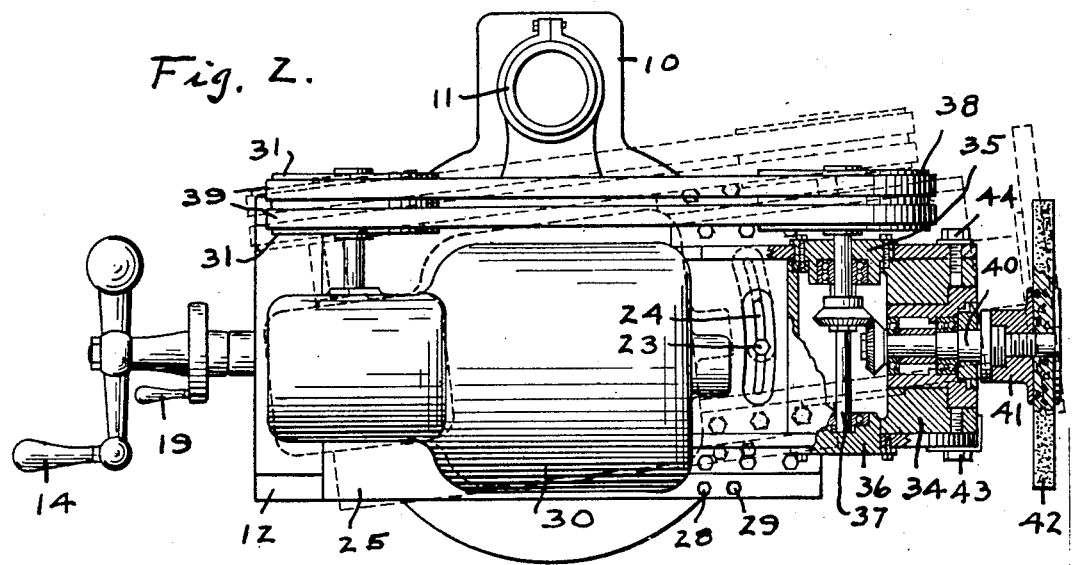
Fig. 2.
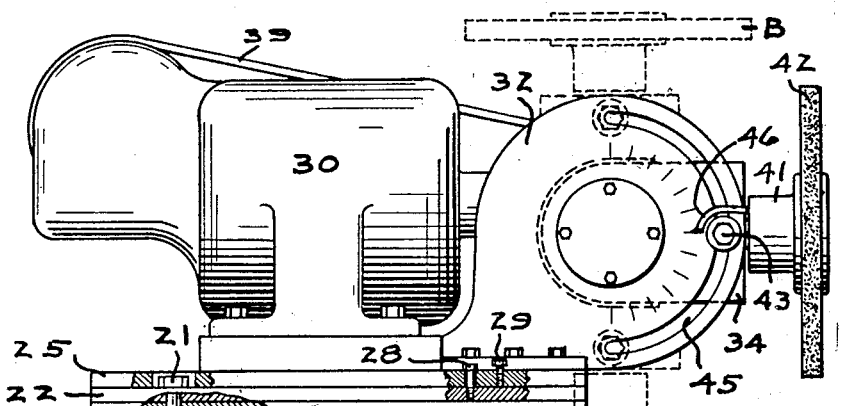
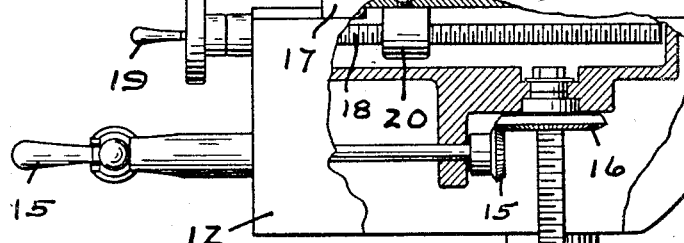
Fig. 1.
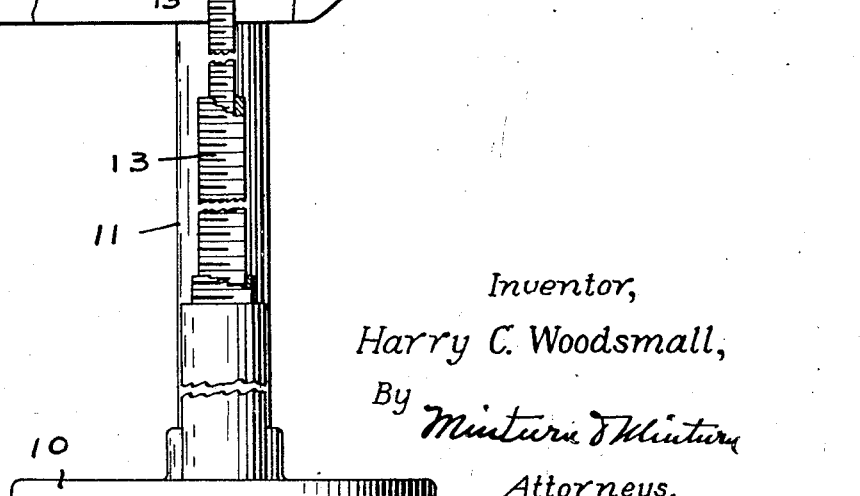
Inventor,
Harry C. Woodsmall,
By Minturn & Minturn
Attorneys.

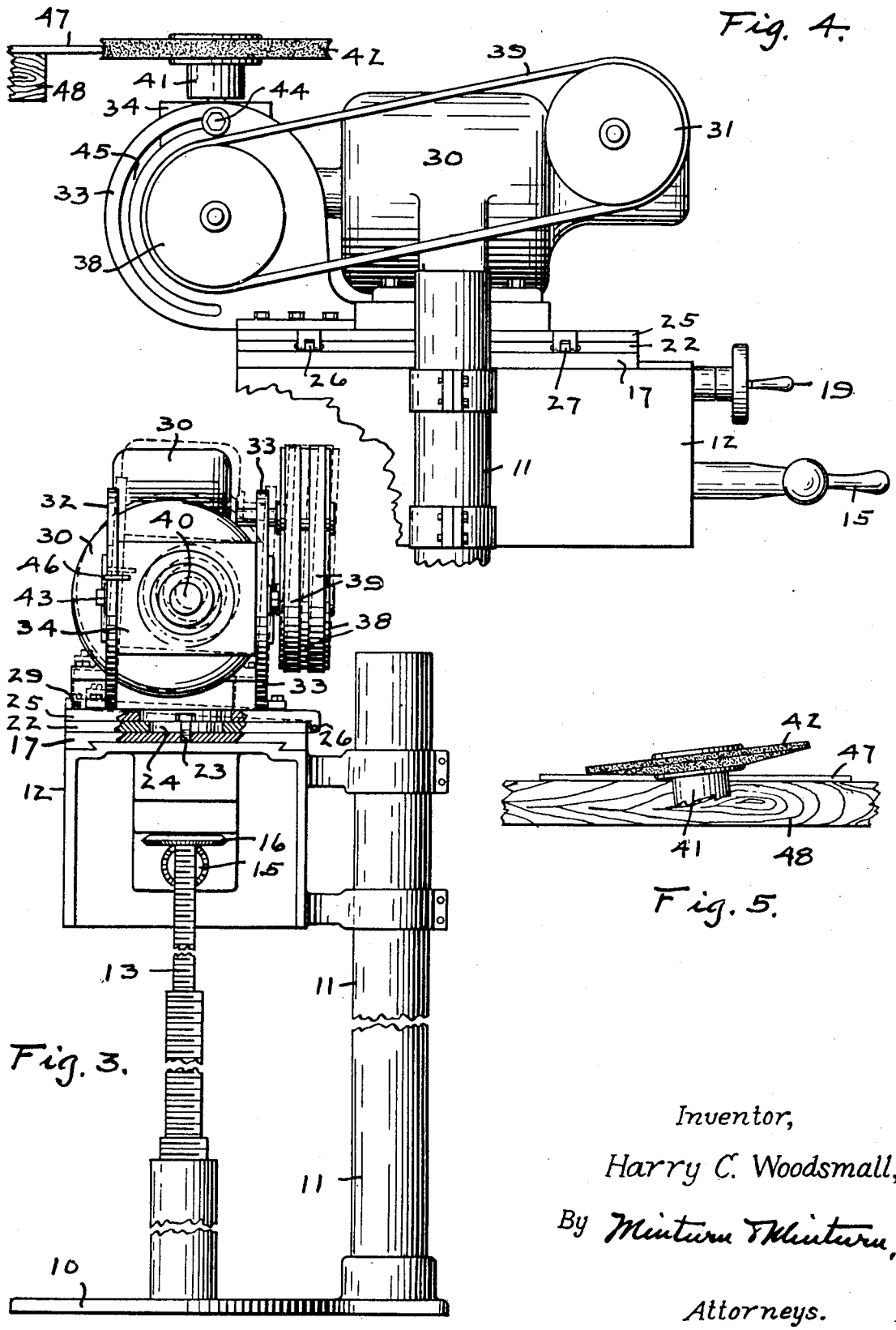

Patented May 15, 1934

1,958,734

UNITED STATES PATENT OFFICE 1,958,734

UNIVERSAL GRINDER

Harry C. Woodsmall, Indianapolis, Ind., assignor to Mary A. Woodsmall, Indianapolis, Ind.

Application December 24, 1932, Serial No. 648,752

5 Claims. (Cl. 51—72)

This invention relates to the art of grinding machines and particularly to a type of machine adapted to operate along the edges or margins of sheets of glass. In using my device, a sheet of glass is customarily placed upon a table in a more or less horizontally disposed position and the table is moved back and forth in respect to the machine. These sheets of glass are formed to meet varying specifications wherein in some cases, the edge is rounded, the corners of the edges merely smoothed off to give a rough rounded effect, the sheet beveled back from the edge on one side or on both sides; in other cases grooves or lines are ground in the glass adjacent the edge to give varying marginal designs; and in some cases the edge is merely squared up with the face of the glass to give a perfectly smooth edge.

Heretofore in performing the operations necessary to achieve the above indicated results, it has been necessary to do such work by guiding the glass over a revolving wheel mounted on a stationary head so that the results obtained depended entirely upon the skill of the operator. Thus it is to be seen that where a quantity of glass is to be worked upon, there will be a variation in the results produced by a number of operators so that a uniform product would not be available.

It is a primary object of my invention to provide a grinding machine which may be set in a wide range of positions so as to reproduce a given cut on the glass in a uniform manner so that the depth and width of the cut does not depend upon the judgment of the operator but entirely upon the setting of the machine.

It is a further primary object of the invention to provide a structure wherein a revolving grinding wheel may be set in any position throughout a range of at least a 180 degrees and further that may be set to vary the cutting angle in respect to the glass both vertically and horizontally. It is a further object of the invention to provide such a structure in a very simple, compact, easily operated and controlled machine which may be produced at a relatively low cost of manufacture and which will remain durable and resist wear through a long period of time.

These and other objects and advantages will become apparent in the following description to those skilled in the art, the description being made in reference to the accompanying drawings wherein Fig. 1 is a fragmentary side elevation;

Fig. 2, a fragmentary top plan view;

Fig. 3, a fragmentary end elevation with the grinding wheel removed;

Fig. 4, a fragmentary elevation of the opposite side of the machine, and

Fig. 5, a detail showing the grinding wheel angularly presented to a sheet of glass.

Like characters of reference indicate like parts throughout the several views in the drawings.

I form a base 10 to which is secured a vertical post 11. A bed frame 12 is carried by the post 11 to be slidable vertically therealong and is held at varying positions by means of a screw 13, here shown as being of a telescoping nature, and as being operated by the hand crank 14 through the bevel gears 15 and 16.

The top side of the frame 12 has a plate 17 slidably secured thereto in the manner of a carriage so that the plate 17 may be shifted longitudinally of the frame horizontally. A screw shaft 18 is longitudinally disposed under the frame to be revolved by a hand crank 19 fixed to the shaft at one end and carried on the outside of the frame. This shaft screwthreadedly passes through a nut 20 to which the plate 17 is secured by a cap screw 21 passing down through the plate 17 and through an opening in the frame whereby rotation of the handle 19 will cause the plate 17 to be shifted along the frame 12 accordingly. A second plate 22 rests on the upper face of the plate 17 and is rockably attached thereto by having the cap screw 21 extend through it as well as through the plate 17. The plate 22 is free to be swung horizontally about this screw 21 within the limits of a retaining screw 23 which passes down through an arcuate slot 24 in the plate 22 and engaged in the plate 17 thereunder, Fig. 3. A third plate 25 rests on the upper face of the plate 22 and is hinged thereto on one side by hinges 26 and 27, Fig. 4. This upper plate 25 is normally held in contact with the under plate 22 by means of the cap screw 28, Figs. 1 and 2, but may be raised therefrom along the side removed from the hinges by loosening this screw 28 and running a second screw 29 screwthreadedly down through the plate 25 against the face of the plate 22.

On the plate 25 is mounted a motor 30, here shown as having a gear reduction carried within its housing in the usual and well known manner, to have a shaft extending from the side of the motor to carry belt pulleys 31, here shown as two in number. Also mounted on the top plate 25 are a pair of vertically disposed plates 32 and 33 spaced apart in parallel relation, between which is carried a head 34.

Referring principally to Fig. 2, a bearing carrier 35 is rockably inserted through the plate 33 and is attached to the head 34. A bearing plate 36 is entered through the plate 32 and fixed thereto to extend into the head 34 and rockably support it therearound. A shaft 37 is revolubly carried by these carriers 35 and 36 and extends outwardly from the carrier 35 to carry belt pulleys 38 thereon, here shown as two in number, and as being aligned with the pulleys 31 carried by the motor. Belts 39, preferably of the V type interconnect the respective pulleys. On the shaft 37 is fixed a beveled gear which is in constant mesh with a gear on the end of a wheel shaft 40 which is revolubly supported in the head 34 to have its axis at right angles to the shaft 37. This shaft 40 extends outwardly from the head 34 and is shaped to receive the mounting hub 41 of a grinding wheel 42. It is thus to be seen that the head 34 is rockably carried between the two plates 32 and 33 whereby, the grinding wheel 42 may be shifted around from a lower position A, Fig. 1, as indicated by dash lines to an upper position B as indicated by dash lines. In order to fix the angular position of the wheel throughout such travel of the head, cap screws 43 and 44 are entered through slots 45 in the respective side plates and screwthreadedly engaged in the head 34 so that they may be drawn up tightly against the plates. In order to indicate the angular position of the wheel shaft, an indicator 46 is provided to travel over a series of indicating markings on the plate 32.

In using the device, a sheet of glass 47, Fig. 4, carried by a table 48 is provided to move horizontally past the machine and the head 34 is swung around through its range of travel to bring the wheel 42 to the position desired to produce that particular cutting effect intended. The wheel 42 as indicated in Fig. 4 is shown as having a grooved periphery to provide a rounded edge on the glass and is shown in the upermost position with the wheel revolving in substantially a horizontal plane. The shape of the wheel 42 is varied in accordance with the particular work desired and may assume any of the forms well known to those skilled in the art. Where the wheel is to grind upon the upper or lower surfaces of the glass, it may be desirable to shift the wheel so that its vertical plane of rotation, Fig. 2, is not parallel to the line of travel of the glass but is angularly disposed thereto somewhat as indicated by the dash lines. This position is effected by loosening the screw 23 and shifting the plate 22 over the plate 17 about the screw 21 as a center of oscillation. Also where the wheel is to be used in some such positions A or B, Fig. 1, the plane of rotation of the wheel may be shifted from parallel relation with the plane of the glass by rocking the plate 25 about its hinges 26 and 27 upwardly from the plate 22 as indicated by the dash lines in Fig. 3, the screw 28 first being loosened and the screw 29 then run down against the plate 22 so as to lift the plate 25 the desired distance, following which the screw 28 is then tightened against the plate 25 to retain that adjustment. By providing these adjustments, so as to change the planes of rotation of the grinding wheel, the glass may be ground smoothly without cutting ridges therein and the polishing operations following the grinding operations are reduced to a minimum. Reference is made to Fig. 5, wherein the wheel is indicated as having been shifted to change its plane of rotation in reference to the glass as above indicated.

While I have herein described and shown my invention in one particular form as now best known to me, it is obvious that structural changes may be made without departing from the spirit of the invention, and I therefore do not desire to be limited to that precise form beyond the limitations as may be imposed by the following claims.

I claim:

1. In a grinding machine, a frame, a driving motor supported by the frame in a relatively fixed position, a drive-shaft at right angles to the motor shaft, a head supported by the frame axially rotatable in a vertical plane about the drive shaft parallel with the motor shaft, and driving means between the motor and the head.

2. In a grinding machine, a frame, a driving motor supported by the frame in a relatively fixed position, a drive-shaft at right angles to the motor shaft, a head supported by the frame axially rotatable in a vertical plane about the drive shaft parallel with the motor shaft, and driving means between the motor and the head, and means interposed between the motor and head and said frame permitting angular shifting of the head varying from said vertical shifting.

3. In a grinding machine, a frame, a plate horizontally slidable on the frame, a second plate pivotally secured over the first plate to permit horizontal swinging, a third plate hinged to the second plate to permit vertically rocking thereof, means for holding a given position of the third plate, a motor fixed on the third plate, a vertically swingable grinder head mounted on the third plate, and driving means between the motor and the head.

4. In a grinding machine, a frame, a plate supported from the frame hinged to swing horizontally, a second plate hinged to the first plate for vertical swinging adjustment, a horizontal drive shaft supported by the second plate and a grinder head axially rotatable in a vertical plane about the drive shaft parallel with the motor shaft.

5. In a grinding machine, a vertically adjustable frame, a plate supported from the frame hinged to swing horizontally, a second plate hinged to the first plate for vertical swinging adjustment, a motor mounted on the second plate, a horizontal drive shaft supported by the second plate in fixed relation to the motor and at right angles to the motor shaft, means for driving the drive shaft from the motor shaft and a grinder head driven from the drive shaft and axially rotatable in a vertical plane about the drive shaft and parallel with the motor shaft.

HARRY C. WOODSMALL.